United States Patent [19]

Smoczynski

[11] 4,402,398

[45] Sep. 6, 1983

[54] COIN CARRYING PLASTIC CARD

[76] Inventor: Frank E. Smoczynski, 5 N. 466 Leola, St. Charles, Ill. 60107

[21] Appl. No.: 324,812

[22] Filed: Nov. 25, 1981

[51] Int. Cl.³ ........................ B32B 3/10; A45C 11/28

[52] U.S. Cl. .................................. 206/0.82; 206/460; 229/92.9; 428/138; 428/42; 428/215; 428/220

[58] Field of Search .................... 428/35, 40, 42, 138, 428/202-204, 215, 13, 332; 206/0.8, 0.82, 0.83, 0.84, 489; 232/1 D; D18/3; 283/7

[56] References Cited

U.S. PATENT DOCUMENTS

| | | | |
|---|---|---|---|
| 3,047,144 | 7/1962 | Wissel | 206/0.83 |
| 3,245,523 | 4/1966 | White | 206/0.83 |
| 3,913,732 | 10/1975 | Peterson | 206/0.84 |

*Primary Examiner*—Paul J. Thibodeau

*Attorney, Agent, or Firm*—Joseph P. Gastel

[57] ABSTRACT

A coin carrying plastic card of a size for carrying in a card carrying section of a wallet or the like including a plastic card body of a first thickness, a hole in the plastic card body for receiving a coin of a second thickness, an edge on the card surrounding the hole, the hole being of slightly larger than the corresponding dimension of the coin so that the edge on the card lies in contiguous relationship to the edge of the coin, the first thickness being of a sufficiently high proportion of the second thickness so that the edge of the card surrounding the hole will provide support to the edge of the coin, and pressure-sensitive tape affixed to one side of the card and extending across the hole for adhesively securing the coin to the card while permitting selective removal and replacement thereof.

5 Claims, 4 Drawing Figures

Fig. 1.
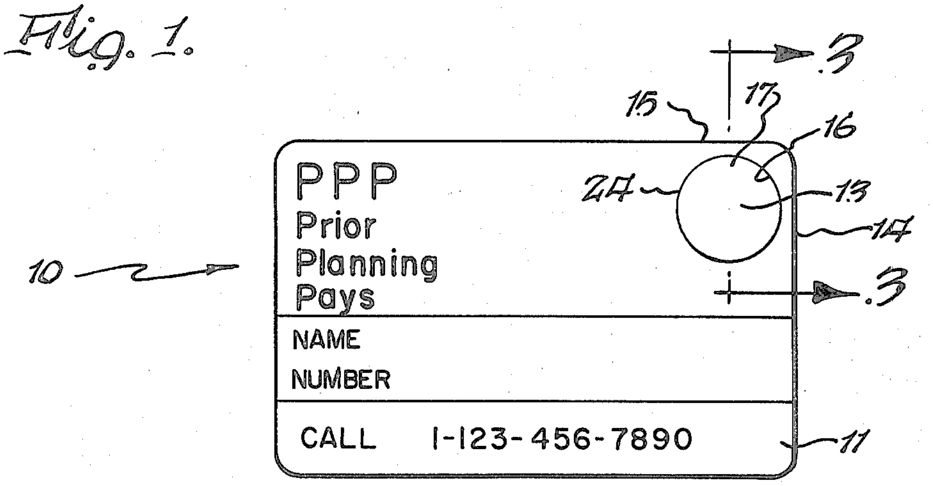
Fig. 2.
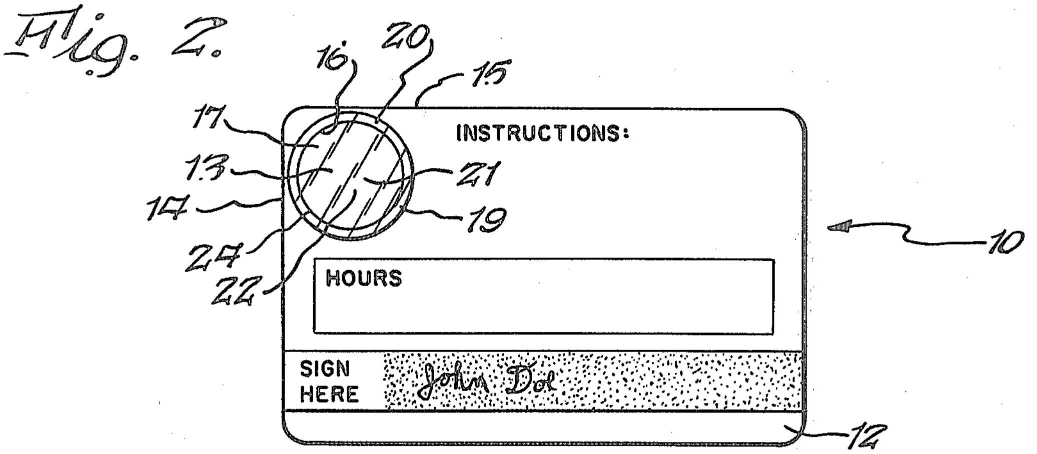
Fig. 3.
Fig. 4.
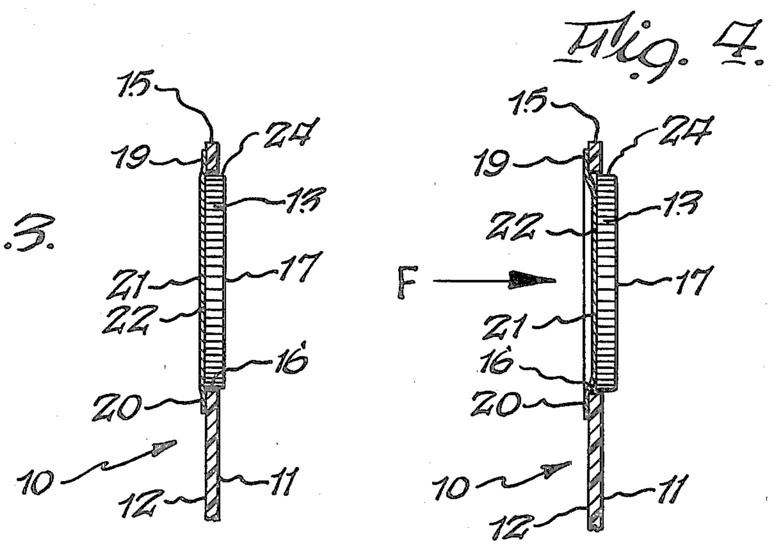

COIN CARRYING PLASTIC CARD

BACKGROUND OF THE INVENTION

The present invention relates to a coin carrying plastic card construction.

By way of background, in the past coins have been affixed to paper cards, such as telephone credit cards, by forming curved spaced slits in the card and slipping the coin through the slits. However, there has been no way of practically mounting coins, such as a dime, on a plastic card of the general type such as used for credit cards or for carrying advertising information.

SUMMARY OF THE INVENTION

It is accordingly the object of the present invention to provide a coin carrying plastic card on which a coin can be mounted in a secure manner and can be removed and replaced as required. Other objects and attendant advantages of the present invention will readily be perceived hereafter.

The present invention relates to a coin carrying plastic card of a size for carrying in a card-carrying section of a wallet or the like comprising a plastic card body of a first thickness, a hole in said plastic card body for receiving a coin of a second thickness, an edge on said card surrounding said hole, said hole being slightly larger than the corresponding dimension of said coin so that said edge on said card lies in contiguous relationship to the edge of said coin, said first thickness being a sufficiently high proportion of said second thickness so that said edge of said card will provide support to the edge of said coin, and pressure sensitive tape affixed to one side of said card and extending across said hole for adhesively securing said coin to said card while permitting selective removal and replacement thereof. The various aspects of the present invention will be more fully understood when the following portions of the specification are read in conjunction with the accompanying drawings wherein:

BRIEF DESCRIPTION OF THE DRAWINGS

FIG. 1 is a view of the front of the coin carrying plastic card of the present invention;

FIG. 2 is a view of the rear of the coin carrying plastic card of the present invention;

FIG. 3 is an enlarged cross sectional view taken substantially along line 3—3 of FIG. 1; and FIG. 4 is a view showing how the coin can be removed from the card.

DESCRIPTION OF THE PREFERRED EMBODIMENTS

Summarizing briefly in advance, there are occasions where a coin, such as a dime, is necessary for the purpose of making a telephone call or for use in a vending machine or a parking meter or possibly even for use as a substitute for a screw driver. By mounting a coin, such as a dime, on the plastic card of the present invention, it can be carried in the card carrying portion of a wallet or purse and the dime will always be accessible for use. The dime can be mounted on a credit card or an advertising card or a card such as a calender or a card carrying any other type of intelligence information.

The improved card 10 of the present invention is fabricated from a plastic, such as polyvinyl chloride, stryrene, or any other suitable plastic. The card may be made of one piece of planar plastic, or it may be a laminate of the type used in credit cards. Card 10 has a front face 11 and a rear face 12. A die-cut hole 13 is formed in card 10. This hole is at least ⅛ inch away from the edges 14 and 15 of the card so that there is sufficient plastic material between the edge 16 of the hole and edges 14 and 15 to prevent distortion of these portions.

Hole 13 is of slightly larger diameter than the coin 17 which it is to receive. For example, if coin 17 is a dime, the diameter of hole 13 will be 0.005 inches larger in diameter so that the hole can easily receive the dime, but the dime will be held against lateral movement in the plane of card 10.

A plastic pressure-sensitive tape 19, which is preferably of circular shape, but which can be of any other desired shape, has its edge portion 20 adhesively secured to the rear 12 of card 10 as shown in FIG. 2, with its central portion 21 overlying hole 13. When the dime 17 is inserted into hole 13, face 22 thereof will be adhesively secured to central portion 21 of pressure-sensitive tape 19.

Card 10 is approximately 0.035 inches thick and the dime is approximately 0.045 inches thick. Thus, the edge portion 16 of hole 13, which is in contiguous relationship to edge 24 of dime 17, will be sufficiently large to effectively stabilize dime 17 against movement out of hole 13 in the direction of the plane of card 10. As noted above, card 10 is 0.035 inches thick and this is 0.005 inches thicker than the normal credit card. The added 0.005 inches provides the added degree of stability which is required to maintain coin 17 securely within hole 13. The ratio of the thickness of the card to the thickness of the coin is about 0.08.

Whenever it is desired to remove coin 17 from hole 13, it is merely necessary to apply a force F (FIG. 4) to the rear of plastic tape 19 to move coin 17 out of hole 13 in an axial direction. When the coin is in the position of FIG. 4, the edge can be grasped and the coin can be removed for use. In order to return a coin into hole 13, it is only necessary to insert it until in makes adhesive contact with tape 19, and the coin 17 will be securely held in position until it is again needed for use. An adhesive tape which has been found satisfactory for use in the above-described manner is sold under the trademark SPEC. TAPE and it is identified by the manufacturer's number ST-400-T.

While the drawings have shown only one hole in the card, it will be appreciated that two holes, such as 13, may be provided so that the card will carry 20 cents for the purpose of providing sufficient coins to make 20-cent phone calls. Also, if desired, the card can carry numerous holes for dimes so as to provide a sufficient number of coins for use in vending machines. By mounting the dimes, which are relatively thin, on the plastic card, such as 10, which is also relatively thin, in the manner described in the present invention, a convenient way of carrying coins in a card carrying section of a wallet or purse is provided so that a person will always have the coins available for use.

While the above description has referred to dimes, it will be understood that the card can carry other denominations of coins, or items such as commemorative coins or religious medallions, and that the hole in the card need not be round, but can be of any other shape which will hold the coin in position.

While the above description has referred only to dimes, it will be appreciated that the principle of the present invention may also be applicable to coins of other denominations, although dimes, because of their thinness, are more conveniently carried in the plastic card of the present invention.

While preferred embodiments of the present invention have been disclosed, it will be appreciated that the present inention is not limited thereto, but may be otherwise embodied within the scope of the following claims.

What is claimed is:

1. A coin carrying plastic card of a size for carrying in a card-carrying section of a wallet or the like comprising a plastic card body of a first thickness, a hole extending entirely through said plastic card body for receiving a coin of a second thickness, an edge on said card surrounding said hole, said hole being slightly larger than the corresponding dimension of said coin so that said edge on said card lies in contiguous relationship to the edge of said coin when said coin is in said hole, said first thickness being less than said second thickness so that said coin will project outwardly beyond said card in a thickness dimension when said coin is in said hole, said first thickness also being a sufficiently high proportion of said second thickness so that said edge of said card will provide support to the edge of said coin against movement out of said hole in a direction of the plane of said plastic card, and flexible pressure sensitive tape affixed to one side of said card and extending across said hole for adhesively securing said coin to said card while permitting selective removal and replacement thereof, said flexible pressure sensitive tape being yieldable in the direction toward said hole for effecting said selective removal of said coin by applying a force on said tape in the direction of said hole to cause said coin to protrude a greater amount from said hole than when said force is absent and thus facilit.ıte grasping of said coin when said force is present.

2. A coin carrying plastic card as set forth in claim 1 wherein said first thickness is in excess of 0.030 inches.

3. A coin carrying plastic card as set forth in claim 1 wherein said first thickness is at least about 0.035 inches.

4. A coin carrying plastic card as set forth in claim 3 wherein said second thickness is about 0.045 inches.

5. A coin carrying plastic card as set forth in claim 1 wherein the ratio of said first thickness to said second thickness is about 0.8.

* * * * *